(12) United States Patent
Gaus

(10) Patent No.: US 9,168,792 B2
(45) Date of Patent: Oct. 27, 2015

(54) PNEUMATIC VEHICLE TIRE WITH TREAD HAVING CIRCUMFERENTIAL GROOVES HAVING PROJECTIONS

(75) Inventor: Helmut Gaus, Neustadt (DE)

(73) Assignee: Continental Reifen Deutschland GmbH, Hannover (DE)

( * ) Notice: Subject to any disclaimer, the term of this patent is extended or adjusted under 35 U.S.C. 154(b) by 634 days.

(21) Appl. No.: 12/632,011

(22) Filed: Dec. 7, 2009

(65) Prior Publication Data
US 2010/0078106 A1    Apr. 1, 2010

Related U.S. Application Data

(63) Continuation of application No. PCT/EP2008/054135, filed on Apr. 7, 2008.

(30) Foreign Application Priority Data

Jun. 6, 2007   (DE) .................. 10 2007 026 813

(51) Int. Cl.
  *B60C 11/04* (2006.01)
  *B60C 11/13* (2006.01)
(52) U.S. Cl.
  CPC ........... *B60C 11/045* (2013.01); *B60C 11/1315* (2013.04); *B60C 11/1323* (2013.04); *B60C 2011/133* (2013.04); *B60C 2011/1338* (2013.04)
(58) Field of Classification Search
  CPC .............. B60C 11/1323; B60C 11/045; B60C 11/1315; B60C 2011/133; B60C 2011/1338
  USPC .................. 152/209.21, 209.24, 901
  See application file for complete search history.

(56) References Cited

U.S. PATENT DOCUMENTS

| 3,055,410 A | 9/1962 | Caulkins |
| 4,114,671 A * | 9/1978 | Maiocchi et al. ........ 152/209.21 |
| 4,423,760 A | 1/1984 | Treves et al. |
| 4,703,788 A * | 11/1987 | Kusube et al. ........... 152/209.21 |

(Continued)

FOREIGN PATENT DOCUMENTS

| EP | 0 069 464 A2 | 1/1983 |
| EP | 1 637 357 A1 | 3/2006 |

(Continued)

OTHER PUBLICATIONS

International Search Report, dated Aug. 4, 2008.

*Primary Examiner* — Steven D Maki
(74) *Attorney, Agent, or Firm* — Laurence A. Greenberg; Werner H. Stemer; Ralph E. Locher

(57) ABSTRACT

A pneumatic vehicle tire has peripheral grooves with outer edges on a tread periphery, running peripherally parallel and substantially linearly. A groove base path on a groove base is wavy or zigzags and narrower than a peripheral groove. Projections of groove sides assigned to inward pointing corners of the groove base path are parts or sections of bodies with a base surface having at least four free sides. The base surface runs near the periphery at an angle of at least 60° and is inclined to the radial. The base surface has boundary surfaces running from the free sides toward the groove base at a smaller angle and being inclined to the radial. Two side surfaces run between adjacent projections in peripheral direction, toward the groove base path and have an angle of inclination to the radial larger than the boundary surface angle and smaller than the base surface angle.

3 Claims, 2 Drawing Sheets

(56) References Cited

U.S. PATENT DOCUMENTS

| | | | |
|---|---|---|---|
| 4,747,435 A * | 5/1988 | Trabandt et al. | 152/209.21 |
| 4,955,415 A * | 9/1990 | Takeuchi et al. | 152/209.21 |
| 5,535,798 A * | 7/1996 | Nakamura | 152/209.21 |
| 7,527,082 B2 | 5/2009 | Fukunaga | |
| 2008/0000565 A1 | 1/2008 | Tomita | |
| 2008/0093000 A1 * | 4/2008 | Fujioka | 152/209.21 |

FOREIGN PATENT DOCUMENTS

| | | |
|---|---|---|
| EP | 1 698 491 A1 | 9/2006 |
| JP | 9-66709 A | 3/1997 |

\* cited by examiner

PNEUMATIC VEHICLE TIRE WITH TREAD HAVING CIRCUMFERENTIAL GROOVES HAVING PROJECTIONS

CROSS-REFERENCE TO RELATED APPLICATION

This is a continuation, under 35 U.S.C. §120, of copending International Application No. PCT/EP2008/054135, filed Apr. 7, 2008, which designated the United States; this application also claims the priority, under 35 U.S.C. §119, of German Patent Application DE 10 2007 026 813.2, filed Jun. 6, 2007; the prior applications are herewith incorporated by reference in their entirety.

BACKGROUND OF THE INVENTION

Field of the Invention

The invention relates to a pneumatic vehicle tire, in particular for utility vehicles, having a plurality of circumferential grooves which run in the circumferential direction and have outer edges on the tread periphery which run at least largely parallel with one another and run around at least substantially linearly in the circumferential direction, wherein a groove base path is formed at the groove base which runs at least approximately in a wave shape or zigzag shape and is narrow compared to the width of the circumferential groove on the tread periphery and has inward pointing corners to which projections of the groove sides are assigned.

A pneumatic vehicle tire having a tread which is constructed in that way is known from U.S. Pat. No. 4,114,671. In order to ensure uniform wear and good grip properties despite increasing wear, in the known tire the groove base path of the circumferential grooves is embodied in such a way that it runs in a pronounced zigzag shape. The projections which are embodied prismatically are bounded by triangular surfaces which extend from the tread periphery as far as the groove base. Foreign bodies, in particular stones, can very easily become trapped in such circumferential grooves.

Many patent applications and patents are concerned with constructing circumferential grooves in the tread in such a way that foreign bodies, in particular small stones, cannot become caught in the grooves. It is therefore known, for example from U.S. Pat. No. 3,055,410, to provide projections which extend as far as the groove base, in zigzag-shaped circumferential grooves on the inward pointing corners. However, the structures which have been known heretofore have not been convincing in practice.

SUMMARY OF THE INVENTION

It is accordingly an object of the invention to provide a pneumatic vehicle tire, which overcomes the hereinafore-mentioned disadvantages of the heretofore-known tires of this general type and in which the tread or the circumferential grooves thereof are constructed in such a way that foreign bodies, in particular small stones, are reliably ejected. At the same time, the durability of the profile and the generation of noise by the profile are to be favorably influenced during rolling.

With the foregoing and other objects in view there is provided, in accordance with the invention, a pneumatic vehicle tire, in particular for utility vehicles, comprising a tread periphery and a plurality of circumferential grooves having a width. The circumferential grooves run in circumferential direction and have outer edges on the tread periphery running at least largely parallel with one another and running around at least substantially linearly in the circumferential direction. The circumferential grooves each have a groove base forming a groove base path running at least approximately in a wave shape or zigzag shape and being narrower than the width of the circumferential grooves on the tread periphery. The groove base path has inwardly pointing corners. The circumferential grooves have groove sides with side surfaces running in direction of the groove base path and with projections associated with the inwardly pointing corners being adjacent in the circumferential direction. The projections are parts or sections of bodies each having a base surface with at least four free sides running inclined at a relatively larger angle of at least 60° relative to a radial direction near the tread periphery and having boundary faces running inclined at a relatively smaller angle relative to the radial direction from the free sides in direction of the groove base. Each two of the side surfaces are disposed between the adjacent projections and the surfaces have an angle of inclination relative to the radial direction being greater than the angle of the boundary surfaces and smaller than the angle of the base surfaces.

Circumferential grooves constructed according to the invention are therefore distinguished by a large number of surfaces which, on one hand, are provided on the projections and, on the other hand, run between the projections which are adjacent in the circumferential direction. These surfaces provide penetrating foreign bodies such as stones with a large number of rolling surfaces which are inclined in different directions, with the result that moving the foreign bodies out of the circumferential grooves is promoted in an optimum way. The projections at the same time stiffen the profile ribs bounded by the circumferential grooves when axially directed forces occur, which counteracts undesired deformation of the profile ribs and therefore also results in a reduced tendency for the circumferential grooves to tear. In addition, the cross section of the circumferential grooves is changed continuously over the circumference as a result of the projections, with the result that groove resonances can hardly occur. The reduction in the cross section of the circumferential grooves by the projections also brings about a toothing effect in the traction direction, which effect is advantageous, in particular, on loose underlying surfaces.

In accordance with another feature of the invention, the angle of the base surface of the projections is up to 85° with respect to the radial direction. The larger this angle, the better the stiffening of the profile ribs, adjacent the circumferential grooves, by the projections, in the case of axially directed ribs when axially direct forces occur.

The profile of the boundary surfaces of the projections is also responsible for moving out penetrating foreign bodies in an optimum way. Therefore, in accordance with a further feature of the invention, the angle which the boundary surfaces enclose with the radial direction should therefore be between 2° and 45°, in particular up to 30°.

In accordance with an added feature of the invention, for the purposes of uniform stiffening of the profile ribs which adjoin the circumferential grooves, it is also advantageous if the base surfaces of the projections are embodied in the form of regular polygons or as parts thereof.

In accordance with an additional feature of the invention, for the purpose of optimum reduction in the cross section of the circumferential grooves by the projections, it is also advantageous if the distance between the point where the base surface is attached to the groove side and the tread periphery is between 10% and 20% of the profile depth.

In accordance with a concomitant feature of the invention, the effects which can be achieved with circumferential grooves constructed according to the invention can be enhanced by virtue of the fact that the outer edges lying opposite the projections are structured through the use of V-shaped indents, from which further oblique surfaces run in the direction of the groove base. The common side of the oblique surfaces should enclose an angle which is selected to be between 2° and 40° with the radial direction.

Other features which are considered as characteristic for the invention are set forth in the appended claims.

Although the invention is illustrated and described herein as embodied in a pneumatic vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
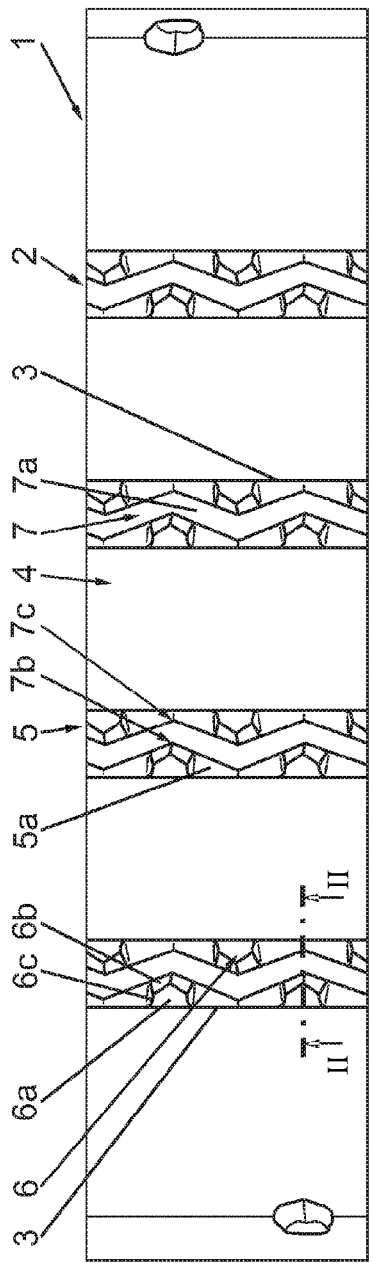
FIG. 1 is a fragmentary, diagrammatic, developed, plan view of an embodiment of a tread of a pneumatic vehicle tire.

Referring now in detail to the figures of the drawings, there is seen a specific embodiment according to the invention of circumferential grooves in treads, in particular in treads of utility vehicle tires. FIG. 1 shows a plan view of a circumferential section of a tread 1 with four circumferential grooves 2 which are spaced apart from one another at equal intervals, run in the circumferential direction and each have, considered in the new state of the tire, two outer edges 3 running linearly on the tread periphery and parallel with one another. The circumferential grooves 2 separate or delimit circumferential ribs 4, which are represented in an unstructured fashion but can be provided with transverse grooves, indents and the like. A maximum depth of the circumferential grooves 2 corresponds to a profile depth PD (see FIG. 2) which is selected to be between 8 mm and 30 mm. A width a of the circumferential grooves 2 corresponds to a mutual distance between the outer edges 3 and is selected to be between 7 mm and 23 mm. The circumferential grooves 2 have two groove sides 5 which lie opposite one another and are structured substantially through the use of side surfaces 5a and projections 6. The side surfaces 5a and the projections 6 run as far as the groove base and in this case bound a comparatively narrow groove base path 7, which has a width between 20% and 30% of the groove width a, runs in a zigzag shape and is composed of sections 7a which are of equal length and are embodied in such a way that a repetition length or wavelength of the zigzag shape is at least 10 mm and at most 100 mm. The projections 6 are positioned in corners 7b of the groove base path 7, in which the corners 7b point inward with respect to the outer edges 3.

Figure 2:
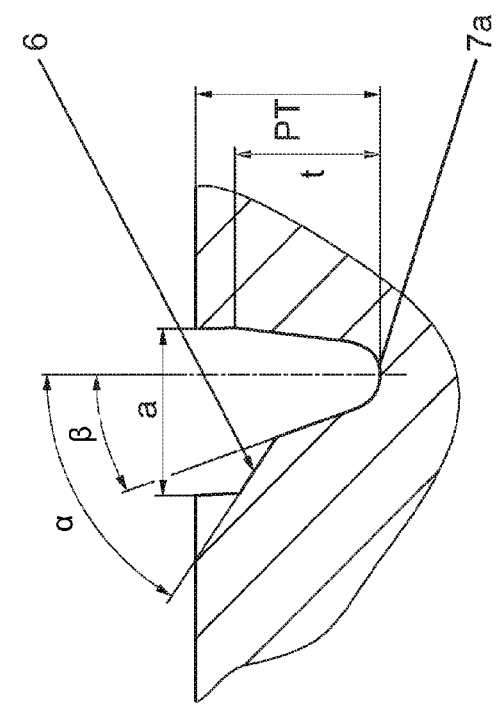
FIG. 2 is an enlarged, fragmentary, cross-sectional view taken along the line II-II in FIG. 1, in the direction of the arrows.

As is shown in FIG. 1 in conjunction with FIG. 2, each projection 6 forms a body which is formed by a base surface 6a and pairs of boundary surfaces 6b and 6c. In this embodiment variant, the base surface 6a is approximately half of a regular hexagon, which is divided in half centrally through the use of two sides lying opposite one another. The boundary side, formed by the halving, of the base surface 6a runs parallel with the outer edge 3 at a distance t from the groove base which is 10% to 20% of the profile depth PD. The distance of this side of the base surface 6a from the tread periphery is preferably between 1.5 mm and 3 mm. The base surface 6a is inclined with respect to the radial direction at an angle α which is between 60° and 85°. The common sides of the boundary surfaces 6b are assigned to the inward pointing corners 7b of the groove base path 7, with the boundary surfaces 6b being inclined with respect to the radial direction at an angle β which is between 2° and 45° and therefore smaller than the angle α. The boundary surfaces 6c run from the sides of the base surface 6a which are adjacent the outer edge 3 in the direction of the groove base, also inclined at an angle β with respect to the radial direction. A junction between the surfaces 6c and 5a is preferably rounded, as illustrated. The surfaces 6c are junction surfaces with the inclined side surfaces 5a and are therefore triangular. The side surfaces 5a run between the projections 6 from the outer edges 3 to the groove base path 7 at an angle with respect to the radial direction which is larger than the angle β but smaller than the angle α. FIG. 2 shows the common side of the side surfaces 5a at the protruding corners 7c of the groove base path 7.

Figure 3:
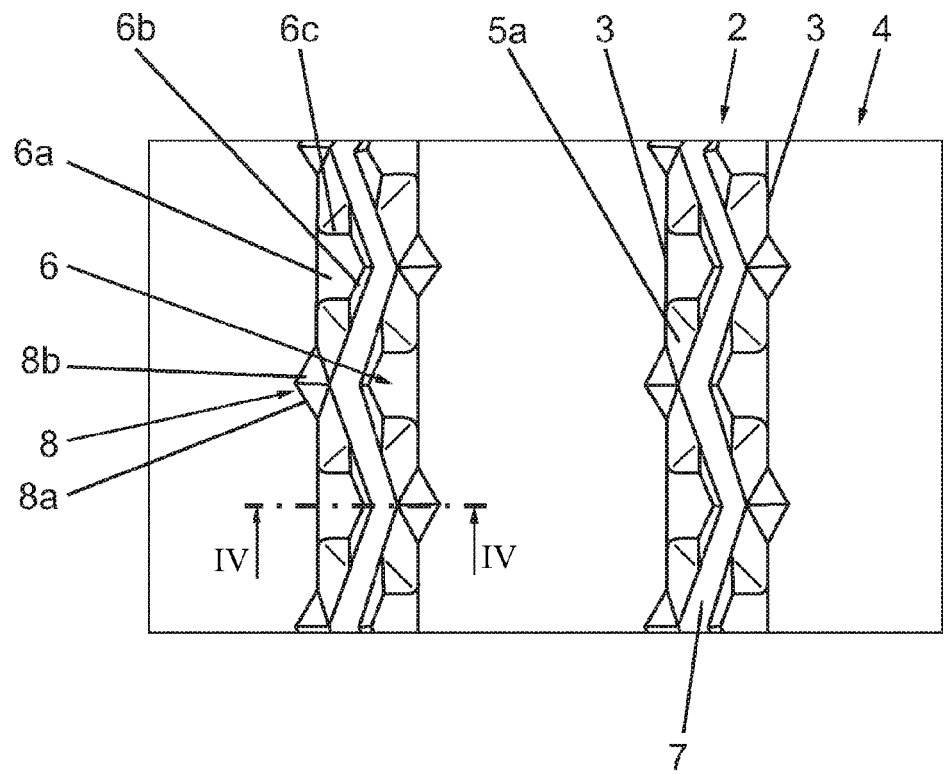
FIG. 3 is an enlarged, fragmentary, developed, plan view of a further embodiment variant of a tread.
Figure 4:
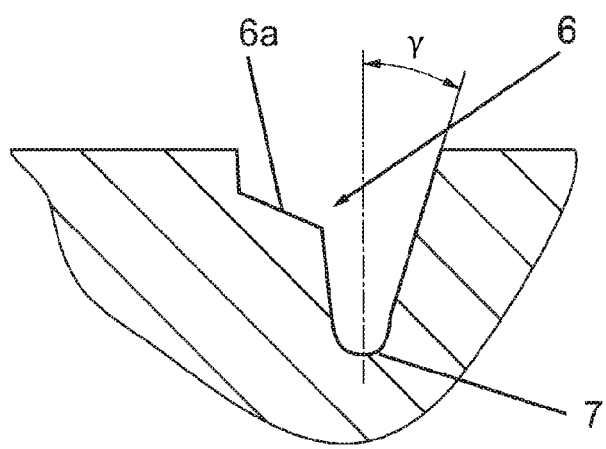
FIG. 4 is a further enlarged, fragmentary, cross-sectional view taken along the line IV-IV in FIG. 3, in the direction of the arrows.

In the embodiment variant shown in FIGS. 3 and 4, the configuration and placement of the circumferential grooves 2 with outer edges 3, projections 6, side surfaces 5a and a zigzag-shaped groove base path 7, correspond to the configuration and placement according to the first embodiment. The projections 6 are provided with base surfaces 6a and boundary surfaces 6b and 6c, in a manner analogous to FIG. 1. In addition, indents 8 which project in a V shape into the respective circumferential rib 4 are formed in those sections of the outer edges 3 which lie opposite the projections 6. Triangular oblique surfaces 8b run to a point from the edges 8a of the indents 8, which run in a V-shape on the tread periphery, at a projecting corner 7c of the groove base path 7. The common side of the oblique surfaces 8b encloses an angle γ with the radial direction, which is selected to be between 2° and 40°. The oblique surfaces 8b can also end at a short distance from the groove base path 7 and in this way form a type of groove base groove along the groove base path 7.

As a result of the configuration and structure of the circumferential grooves 2 according to the invention with a plurality of surfaces which run at different angles with respect to the radial direction and for the most part also make relatively large angles of aperture available, rolling surfaces are formed for penetrating foreign bodies such as small stones and the rolling surfaces convey those foreign bodies out of the circumferential grooves 2. The groove base path 7 which runs in a zigzag shape and is formed on the groove base can also be rounded at its corners, which is advantageous for the durability of the profile. The configuration of the projections 6 causes local reductions in cross section of the circumferential grooves 2 in the traction direction. The boundary surfaces of the projections form edges on the projections which favorably influence the transverse stiffness of the tread. The cross section of the circumferential grooves also changes continuously in the circumferential direction so that groove resonances cannot be generated and the rolling noise is therefore influenced in an advantageous way.

The invention claimed is:

1. A pneumatic vehicle tire, comprising:
a tread periphery;
a plurality of circumferential grooves having a width;
said circumferential grooves running in circumferential direction and having outer edges on said tread periphery running at least largely parallel with one another and running around at least substantially linearly in said circumferential direction;
said circumferential grooves each having a groove base forming a groove base path running at least approximately in a wave shape or zigzag shape and being narrower than said width of said circumferential grooves on said tread periphery, said groove base path having inwardly pointing corners;
said circumferential grooves having groove sides with side surfaces running in direction of said groove base path and with projections associated with said inwardly pointing corners being adjacent in said circumferential direction;
said projections being parts or sections of bodies each having a base surface with at least four free sides running inclined at a relatively larger angle of at least 60° relative to a radial direction near said tread periphery and having boundary faces running inclined at a relatively smaller angle relative to said radial direction from said free sides in direction of said groove base;
each two of said side surfaces being disposed between said adjacent projections and said surfaces having an angle of inclination relative to said radial direction being greater than said angle of said boundary faces and smaller than said angle of said base surface; and
wherein said base surface is attached to said groove side at a point spaced apart from said tread periphery by a distance of between 10% and 20% of a profile depth.

2. A pneumatic vehicle tire, comprising:
a tread periphery;
a plurality of circumferential grooves having a width;
said circumferential grooves running in circumferential direction and having outer edges on said tread periphery running at least largely parallel with one another and running around at least substantially linearly in said circumferential direction;
said circumferential grooves each having a groove base forming a groove base path running at least approximately in a wave shape or zigzag shape and being narrower than said width of said circumferential grooves on said tread periphery, said groove base path having inwardly pointing corners;
said circumferential grooves having groove sides with side surfaces running in direction of said groove base path and with projections associated with said inwardly pointing corners being adjacent in said circumferential direction;
said projections being parts or sections of bodies each having a base surface with at least four free sides running inclined at a relatively larger angle of at least 60° relative to a radial direction near said tread periphery and having boundary faces running inclined at a relatively smaller angle relative to said radial direction from said free sides in direction of said groove base;
each two of said side surfaces being disposed between said adjacent projections and said surfaces having an angle of inclination relative to said radial direction being greater than said angle of said boundary faces and smaller than said angle of said base surface; and
wherein said outer edges lying opposite said projections are structured by V-shaped indents, from which oblique surfaces run in direction of said groove base.

3. The pneumatic vehicle tire according to claim 2, wherein said oblique surfaces have a common side enclosing an angle of between 2° and 40° with said radial direction.

* * * * *